(12) United States Patent
Totani et al.

(10) Patent No.: US 9,205,597 B2
(45) Date of Patent: Dec. 8, 2015

(54) HEAT SEAL BAR MOUNTING APPARATUS OF PLASTIC BAG MAKING MACHINE

(75) Inventors: Mikio Totani, Kyoto (JP); Tomoyuki Nakamura, Kyoto (JP)

(73) Assignee: Totani Corporation, Kyoto (JP)

( * ) Notice: Subject to any disclaimer, the term of this patent is extended or adjusted under 35 U.S.C. 154(b) by 673 days.

(21) Appl. No.: 13/590,519

(22) Filed: Aug. 21, 2012

(65) Prior Publication Data

US 2013/0059710 A1    Mar. 7, 2013

(30) Foreign Application Priority Data

Sep. 1, 2011    (JP) ................................. 2011-190767

(51) Int. Cl.
| | |
|---|---|
| B23K 37/00 | (2006.01) |
| B29C 65/00 | (2006.01) |
| B29C 65/18 | (2006.01) |
| B31B 1/64 | (2006.01) |
| B31B 1/74 | (2006.01) |
| B65B 51/10 | (2006.01) |
| F16B 21/09 | (2006.01) |

(52) U.S. Cl.
CPC ............. B29C 65/18 (2013.01); B29C 66/8167 (2013.01); B29C 66/8511 (2013.01); B29C 66/43 (2013.01); B29C 66/8122 (2013.01); B29C 66/81264 (2013.01); F16B 21/09 (2013.01)

(58) Field of Classification Search
CPC .................... B29C 65/18; B29C 66/81–66/82; B29C 66/8511; F16B 21/09; B65B 51/14; B65B 51/146; B65B 51/303; Y10T 403/4694
USPC ............ 493/189, 470, 480; 156/583.1–583.9; 53/370.7, 373.7, 375.9; 100/315–326
See application file for complete search history.

(56) References Cited

U.S. PATENT DOCUMENTS

| | | | | | |
|---|---|---|---|---|---|
| 2,591,935 | A | * | 4/1952 | Heigl .............................. | 156/386 |
| 2,638,964 | A | * | 5/1953 | Andina .......................... | 100/321 |
| 3,102,182 | A | * | 8/1963 | Oelze et al. ................... | 100/318 |
| 3,779,838 | A | * | 12/1973 | Wech .......................... | 156/583.1 |
| 5,266,150 | A | * | 11/1993 | Miller .......................... | 156/583.4 |
| 6,085,495 | A | * | 7/2000 | Fontanazzi et al. ............. | 53/551 |
| 6,450,088 | B1 | * | 9/2002 | Hutchinson ................... | 100/320 |
| 6,472,638 | B1 | * | 10/2002 | Sperry et al. .................. | 219/243 |
| 6,739,367 | B1 | * | 5/2004 | Totani ........................... | 156/498 |
| 7,056,405 | B2 | * | 6/2006 | Worden ......................... | 156/228 |
| 8,124,915 | B2 | * | 2/2012 | Bertram et al. ................ | 219/243 |
| 2006/0090841 | A1 | | 5/2006 | Worden | |
| 2007/0006973 | A1 | * | 1/2007 | King et al. ..................... | 156/515 |
| 2009/0313944 | A1 | * | 12/2009 | Ghiotti et al. ................ | 53/374.4 |

FOREIGN PATENT DOCUMENTS

| | | | | |
|---|---|---|---|---|
| JP | 2001-310398 | | 11/2001 | |
| JP | 2002-130255 | | 5/2002 | |
| JP | 2002130255 | A * | 5/2002 | .............. F16C 13/00 |

\* cited by examiner

*Primary Examiner* — Thanh Truong
*Assistant Examiner* — Joshua Kotis
(74) *Attorney, Agent, or Firm* — Kirschstein, Israel, Schiffmiller & Pieroni, P.C.

(57) ABSTRACT

A heat seal bar is mounted on and removed from a heater unit in a plastic bag making machine without difficulty. An insert is received and fixed to a receiving recess formed in the heat seal bar. A tension pin is supported by the heater unit, inserted into an adjacent recess, and then inserted into an axial groove through an axial opening. The tension pin is pulled and moved axially thereof by an actuator member at the heater unit until a head of the tension pin engages an inward protrusion of the insert. The tension pin and the insert cooperate to mount the heat seal bar on the heater unit.

4 Claims, 5 Drawing Sheets

(A)

(B)

(A)

(B)

(D)

(C)

(A)

(B)

(C)

HEAT SEAL BAR MOUNTING APPARATUS OF PLASTIC BAG MAKING MACHINE

FIELD OF THE INVENTION

The invention relates to an apparatus for mounting a heat seal bar on a heater unit in a machine successively making plastic bags.

BACKGROUND OF THE INVENTION

In a machine successively making plastic bags, it is required to mount a heat seal bar on a heater unit so that plastic films can be heat sealed with each other by the heat seal bar, as disclosed in Japanese Laid-Open Patent Publication No. 2001-310398. In general, a bolt is used to mount the heat seal bar on the heater unit. However, the heat seal bar is formed of aluminum and therefore soft. In this connection, the heat seal bar has to be reinforced by an insert. The insert is cylindrical, including outer and inner threads, as disclosed in Japanese Laid-Open Patent Publication No. 2002-130255. In addition, a hole is formed in the heat seal bar so that the insert can be received in the hole and engaged therewith threadedly. The bolt is received in the insert and engaged therewith threadedly, mounting the heat seal bar on the heater unit.

In this case, it is required to remove the heat seal bar and mount it again for adjustment of position when changing the size of plastic bag. In addition, it is required to remove the heat seal bar and mount it again for exchange of heat seal bar when changing a width with which the plastic films are heat sealed and when changing a shape with which the plastic films are heat sealed. In this connection, it should be understood that in general, the machine includes more than 4 heat seal bars. In addition, a plurality of bolts are used for each of the heat seal bars. It is therefore troublesome to manipulate the bolts by tool when removing each of the heat seal bars and mounting it again, taking time and labor. In particular, the heat seal bar is kept being heated at a high temperature during removing it, making the work difficult when taking time for removing the heat seal bar.

It is therefore an object of the invention to provide an apparatus for mounting a heat seal bar on a heater unit in a machine successively making plastic bags, which can mount and remove the heat seal bar without difficulty.

SUMMARY OF THE INVENTION

According to the invention, the apparatus includes a receiving recess formed in the heat seal bar to be opposed to the heater unit. An insert is received in and fixed to the receiving recess to extend in a direction in which the receiving recess is opposed to the heater unit. The insert includes axially outer and inner end portions and a side. The insert further includes an axial groove formed therein to open to the side so that an axial opening should be formed in the side, An adjacent recess is formed in the heat seal bar to be disposed adjacent the receiving recess. The adjacent recess is communicated with the axial opening and the axial groove. A tension pin is supported by the heater unit to extend toward the heat seal bar and terminate at a head formed on the tension pin. The tension pin is inserted into the adjacent recess and then inserted into the axial groove through the axial opening. An inward protrusion is formed on the insert to protrude into the axial groove at the axially outer end portion of the insert. An actuator is provided at the heater unit, the tension pin being pulled and moved axially thereof by the actuator after being inserted into the axial groove so that the head should be engaged with the inward protrusion. The tension pin and the insert cooperate with each other to mount the heat seal bar on the heater unit.

In a preferred embodiment, an inner groove is formed in the heat seal bar about the receiving recess at the axially inner end portion of the insert. An outward protrusion is formed on the insert at the axially inner end portion. The outward protrusion is fitted into the inner groove so that the insert should be fixed to the receiving recess by the outward protrusion and the inner groove.

In another embodiment, the receiving recess comprises a hole including an inner thread formed therein. The insert includes an outer thread formed thereon. The insert is engaged with the hole threadedly to be fixed to the hole by the inner and outer threads.

The insert is U-shaped in section so that the axial groove should comprise a semi-circular portion and a straight portion. The inward protrusion protrudes into the semi-circular portion and the straight portion. The semi-circular portion has a center, the inward protrusion including a tapered surface formed thereon about the center of the semi-circular portion. The head is circular shaped in section to include a tapered surface formed thereon. The tapered surfaces are engaged with each other to position the heat seal bar when the head is engaged with the inward protrusion.

DETAILED DESCTIPTION OF THE INVENTION

Embodiments of the invention are as follows.

Figure 1:
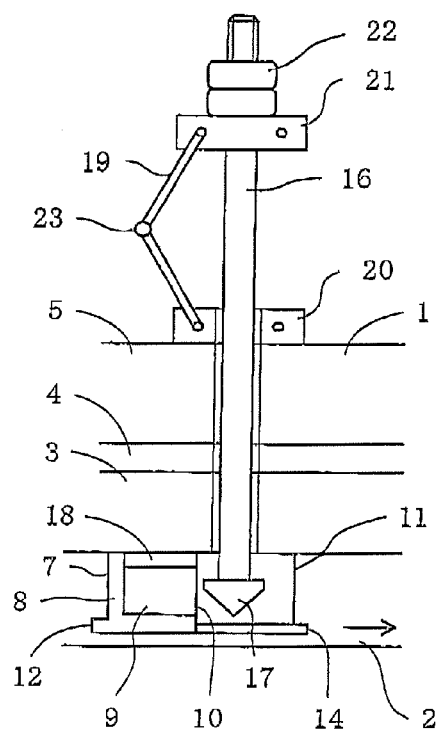
FIG. 1 is a sectional view (A) of a preferred embodiment of the invention and a sectional view (B) of the heat seal bar of (A) after mounting.
Figure 1:
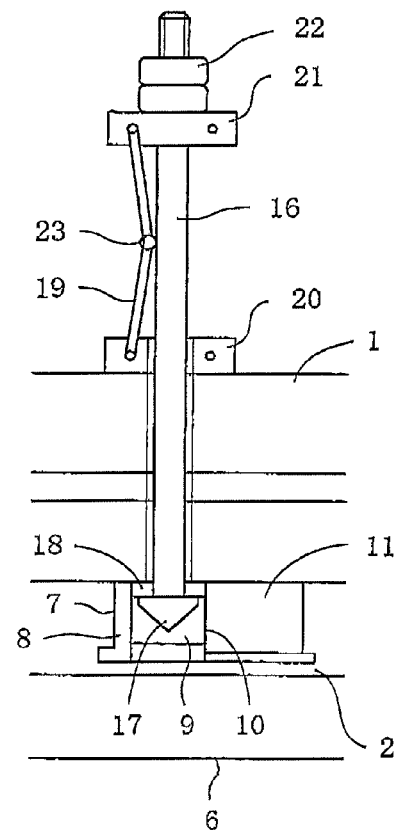

Turning now to the drawings, FIG. 1 illustrates an apparatus according to the invention. The apparatus belongs to a machine successively making plastic bags. The machine includes a heater unit 1 and a heat seal bar 2, the heater unit 1 comprising a heater 3, a thermal insulator 4 and a heater hunger 5. The apparatus is arranged to mount the heat seal bar 2 on the heater unit 1, at the lower surface of the heater unit 1. The heat seal bar 2 is therefore heated by the heater 3. In addition, plastic films 6 are fed longitudinally thereof and intermittently. The machine further includes a receiver not shown for the heat seal bar 2. The heater unit 1 is moved and lowered toward the plastic films 6 and the receiver so that the plastic films 6 should be sandwiched between the heat seal bar 2 and the receiver when the plastic films 6 are stopped. The plastic films 6 are therefore heat sealed with each other by the heat seal bar 2 to successively make the plastic bags of plastic films 6. The heat seal bar 2 is formed of aluminum and therefore soft.

Figure 2:
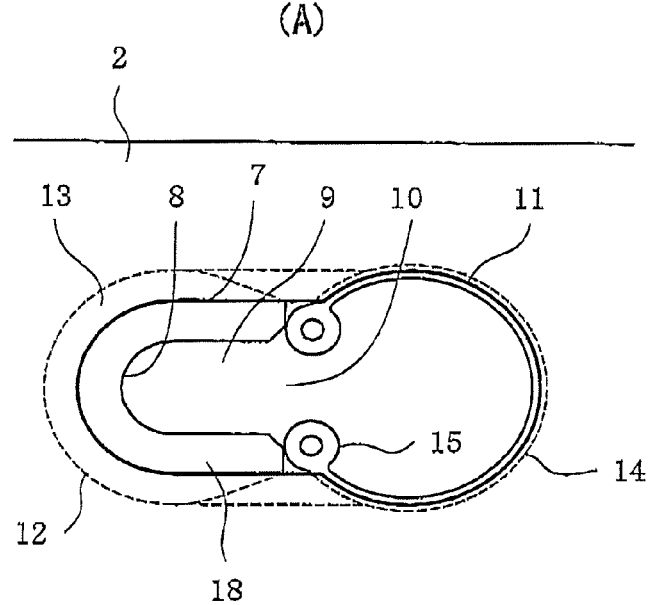
FIG. 2 is a plan view (A) of the receiving recess, the adjacent recess and the insert of FIG. 1, a perspective view (B) of the insert of FIG. 1, a perspective view (C) in a different direction and a sectional view (D) of the head of FIG. 1 engaged with the inward protrusion.
Figure 2:
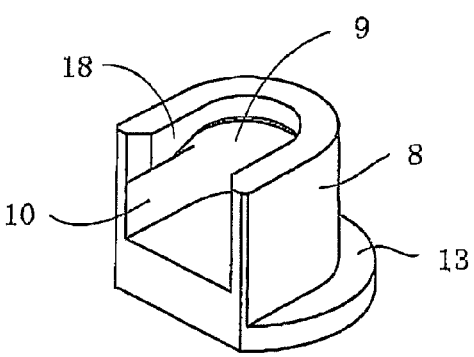
Figure 2:
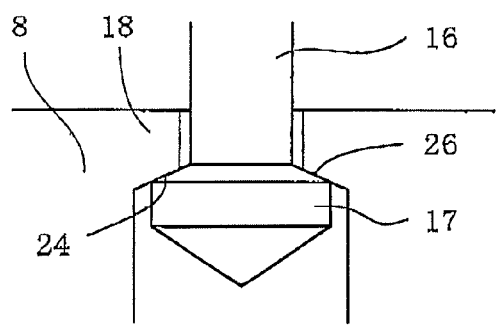
Figure 2:
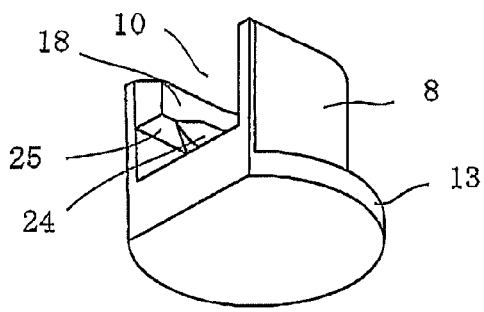

The apparatus includes a receiving recess 7 formed in the heat seal bar 2 to be opposed to the heater unit 1, at the upper surface of the heat seal bar 2. An insert 8 is received in and fixed to the receiving recess 7 to extend in a direction in which the receiving recess 7 is opposed to the heater unit 1. The insert 8 includes axially outer and inner end portions and a side. The insert 8 further includes an axial groove 9 formed therein to open to the side so that an axial opening 10 should be formed in the side, as shown in FIG. 2. The insert 8 is formed of iron or brass. In addition, an adjacent recess 11 is formed in the heat seal bar 2 to be disposed adjacent the receiving recess 7. The adjacent recess 11 is communicated with the axial opening 10 and the axial groove 9. The adjacent recess 11 is larger than the receiving recess 7.

In the embodiment, an inner groove 12 is formed in the heat seal bar 2 about the receiving recess 7 at the axially inner end portion of the insert 8. An outward protrusion 13 is formed on the insert 8 at the axially inner end portion. The outward protrusion 13 is flanged shaped. In this connection, it should be understood that the insert 8 is firstly inserted into the adjacent recess 11. The insert 8 is then pushed into and received in the receiving recess 7 from the adjacent recess 11 so that the outward protrusion 13 can be fitted into the inner groove 12. In addition, an inner groove 14 is formed in the heat seal bar 2 about the adjacent recess 11 at the axially inner end portion of the adjacent recess 11. A snap ring 15 is inserted into the adjacent recess 11, fitted into the inner groove 14 and engaged with the insert 8 so that the insert 8 should be fixed to the receiving recess 11 by the snap ring 15, the outward protrusion 13 and the inner groove 12.

Furthermore, a tension pin 16 is supported by the heater unit 1 to extend toward the heat seal bar 2 and terminate at a head 17 formed on the tension pin 16. The heat seal bar 2 is manipulated and lifted by hand to be engaged with the heater unit 1 when mounting the heat seal bar 2 on the heater unit 1, so that the tension pin 16 can be inserted into the adjacent recess 11, as shown in FIG. 1(A). The heat seal bar 2 is then manipulated by hand to be moved along the heater unit 1 so that the tension pin 16 can be inserted into the axial groove 9 through the axial opening 10, as shown in FIG. 1(B).

Moreover, an inward protrusion 18 is formed on the insert 8 to protrude into the axial groove 9 at the axially outer end portion of the insert 8. An actuator is provided at the heater unit 1, the tension pin 16 being pulled and moved axially thereof by the actuator after being inserted into the axial groove 9 so that the head 17 should be engaged with the inward protrusion 18. In the embodiment, the actuator comprises a push lever 19, the tension pin 16 extending through the heater unit 1 so that a guide 20 can be fitted with the tension pin 16 and engaged with the heater unit 1 at the upper surface of the heater unit 1. A slide 21 is disposed above the guide 20 and fitted with the tension pin 16 for movement along the tension pin 16. The slide 21 and the guide 20 are connected to each other by the push lever 19. In addition, the tension pin 16 includes an outer thread formed thereon. A nut 22 is engaged with the tension pin 16 threadedly to be engaged with the slide 21.

The push lever 19 comprises a pair of links connected to each other by a center pin 23 so that the push lever 19 can be swung and bent about the center pin 23. The push lever 19 is bent into a position of FIG. 1(A) and held and locked at the position by the center pin 23. It should therefore be understood that the tension pin 16 is supported by the heater unit 1, the guide 20, the push lever 19, the slide 21 and the nut 22. The tension pin 16 and the head 17 can be moved by rotating the nut 22 for adjustment of height.

The push lever 19 is then pushed by hand at the position of the center pin 23 after the tension pin 16 is inserted into the axial groove 9 so that the push lever 19 can be swung about the center pin 23 for elongation. The tension pin 16 is therefore pulled and moved axially thereof and upwardly by the push lever 19, the slide 21 and the nut 22 after being inserted into the axial groove 9 so that the head 17 should be engaged with the inward protrusion 18. The heat seal bar 2 is pulled upwardly by the tension pin 16 and the insert 8 to be pressed against the heater unit 1. In addition, the push lever 19 is bent reversely and slightly about the center pin 23 as shown in FIG. 1(B) and held and looked at the position by the center pin 23. It should therefore be understood that the tension pin 16 and the insert 8 cooperate with each other to mount the heat seal bar 2 on the heater unit 1.

By contraries, the push lever 19 is pulled by hand at the position of the center pin 23 to be swung and bent about the center pin 23 when removing the heat seal bar 2 from the heater unit 1. The tension pin 16 is therefore moved axially thereof and lowered so that the head 17 can be disengaged from the inward protrusion 18. The push lever 19 is bent into the position of FIG. 1(A) and locked at the position by the center pin 23. The heat seat bar 2 is then manipulated by hand to be moved along the heater unit 1 so that the tension pin 16 can be drawn out of the receiving recess 9 and return to the adjacent recess 11 through the axial opening 10. In addition, the heat seal bar 2 is manipulated and lowered by hand so that the tension pin 16 can be drawn out of the adjacent recess 11 to remove the heat seal bar 2 from the heater unit 1.

Figure 3:
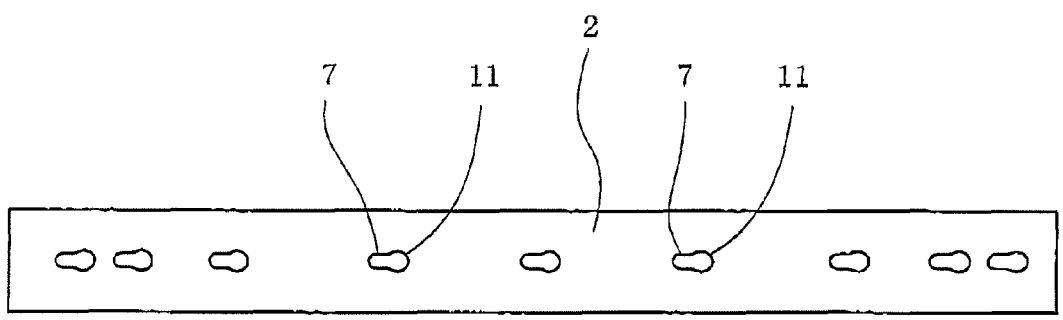
FIG. 3 is a plan view of the heat seal bar of FIG. 1.

It should be understood that in general, the machine includes more than 4 heat seal bars 2. In addition, a plurality of receiving recesses 7 and adjacent recesses 11 are formed for each of the heat seal bars 2, as shown in FIG. 3. A plurality of tension pins 16 and inserts 8 are used for each of the heat seal bars 2 to mount it.

In the embodiment, the insert 8 is U-shaped in section so that the axial groove 9 should comprise a semi-circular portion and a straight portion. The inward protrusion 18 is flanged shaped to protrude into the semi-circular portion and the straight portion. The semi-circular portion has a center, the inward protrusion 18 including a tapered surface 24 formed thereon about the center of the semi-circular portion. The tapered surface 24 faces downward and extends through the inward protrusion 18 of semi-circular portion to reach the inward protrusion 18 of straight portion. The tapered surface 24 is therefore formed at an angle of over 180°. In addition, inclined surfaces 25 are formed on the inward protrusion 18 of straight portion. The inclined surfaces 25 face downward to be inclined upward and inward of the straight portion and inclined upward and toward the tapered surface 24. On the other hand, the head 17 is circular-shaped in section to include a tapered surface 26 formed thereon. The tapered surface 26 faces upward. The tapered surfaces 24 and 26 are therefore engaged with each other to center the tension pin 16 and the insert 8 and position the heat seal bar 2 when the tension pin 16 is pulled axially thereof by the push lever 19 and the head 17 is engaged with the inward protrusion 18.

Accordingly, in the apparatus, it is not required to manipulate bolts by tool when removing each of the heat seal bars 2 and mounting it again. The push lever 19 can make the tension pin 16 moved axially thereof to mount and remove the heat seal bar 2. The apparatus can therefore mount and remove the heat seal bar 2 without difficulty and without taking time and labor. Even if the heat seal bar 2 is kept being heated at a high temperature, the apparatus does not take time for removing the heat seal bar 2, not to make the work serious.

In addition, the apparatus can make the heat seal bar 2 formed of aluminum without problem. The heat seal bar 2 is reinforced by the insert 8 not to be damaged by stress when mounting.

It should be understood that the actuator not always comprises the push lever 19. The actuator may comprise a cylinder, a servo motor or a linear solenoid valve by which the tension pin 16 is pulled and moved. The actuator may comprise some others.

Figure 4:
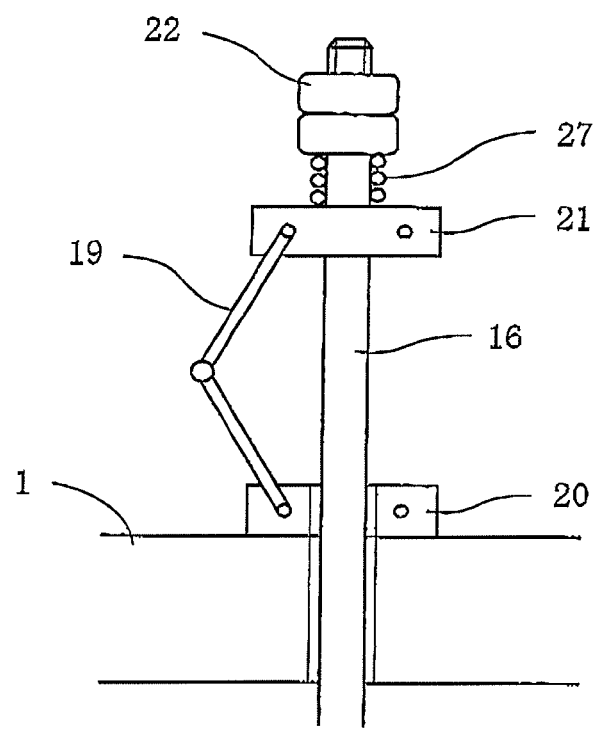
FIG. 4 is a sectional view of another embodiment.

A spring 27 may be interposed between the slide 21 and the nut 22 about the tension pin 16, as shown in FIG. 4. In this case, the spring 27 exerts action on the nut 22, the tension pin 16 and the head 17 so that the head 17 can be engaged with the inward protrusion 18 reliably when the tension pin 16 is pulled axially thereof by the push lever 19.

Figure 5:
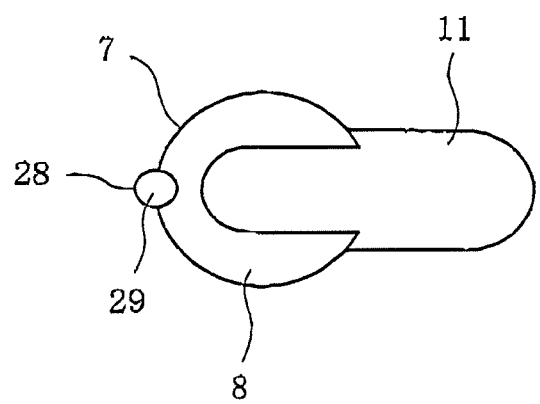
FIG. 5 is a plan view (A) of another embodiment, a sectional view (B) of another embodiment and a sectional view (C) of another embodiment.
Figure 5:
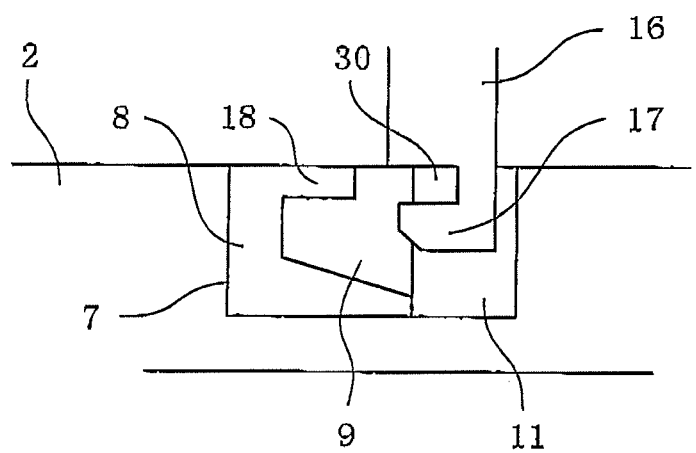
Figure 5:
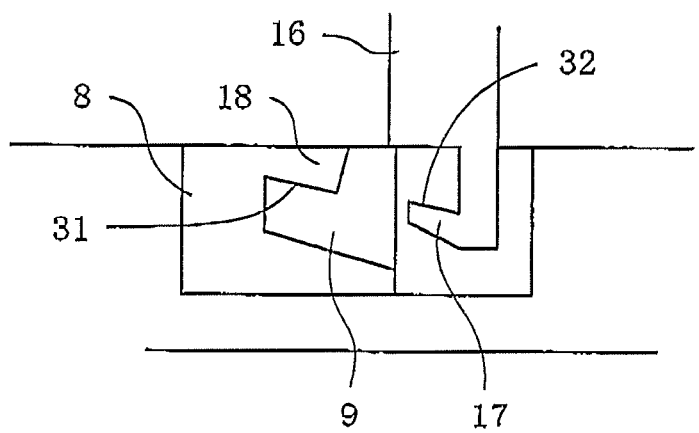

The receiving recess 7 may comprise a hole including an inner thread formed therein, as shown in FIG. 5(A). The insert 8 includes an outer thread formed thereon. The insert 8 is engaged with the hole threadedly to be fixed to the hole by the inner and outer threads. In addition, the heat seal bar 2 and the insert 2 include a hole 28 formed therein so that a pin 29 can be fitted into the holes 28 to keep the insert 8 from rotating. Other features are the same as the embodiments of FIGS. 1 and 4.

The tension pin 16 may includes a receiving groove 30 formed therein and a head 17 formed thereon, as shown in FIG. 5(B). The head 17 extends toward the insert 8 when the tension pin 16 is inserted into the adjacent recess 11. The tension pin 16 is then inserted into the axial groove 9 so that the inward protrusion 18 should be received in the receiving groove 30. The tension pin 16 is pulled and moved axially thereof by the actuator after being inserted so that the head 17 should be engaged with the inward protrusion 18. The tension pin 16 and the insert 8 cooperate with each other to mount the heat seal bar 2 on the heater unit 1. The inward protrusion 18 may include an inclined surface 31 formed thereon, the head 17 including an inclined surface 32 formed therein, so that the inclined surfaces 31 and 32 can be engaged with each other to lock the tension pin 16, as shown in FIG. 5(C).

What is claimed:

1. An apparatus for mounting a heat seal bar on a heater unit in a machine successively making plastic bags, the apparatus comprising:
    a receiving recess formed in the heat seal bar to be opposed to the heater unit;
    an insert received in and fixed to the receiving recess to extend in a direction in which the receiving recess is opposed to the heater unit, the insert including external and internal end portions and a side, the insert further including an axial groove formed therein to open to the side so that an axial opening is formed in the side;
    an adjacent recess formed in the heat seal bar to be disposed adjacent the receiving recess in a direction crossing the direction in which the receiving recess is opposed to the heater unit, the adjacent recess being communicated with the axial opening and the axial groove;
    a tension pin supported by the heater unit to extend toward the heat seal bar and terminate at a head formed thereon, the tension pin being inserted into the adjacent recess and then inserted into the axial groove through the axial opening;
    an inward protrusion formed on the insert to protrude into the axial groove at the external end portion of the insert; and
    an actuator member provided at the heater unit, the tension pin being actuated by the actuator member to be pulled and moved axially thereof and relatively to the heater unit after being inserted into the axial groove so that the head is engaged with the inward protrusion, the tension pin and the insert cooperating with each other to mount the heat seal bar on the heater unit.

2. The apparatus set forth in claim 1 wherein an inner groove is formed in the heat seal bar about the receiving recess at the internal end portion of the insert, an outward protrusion being formed on the insert at the internal end portion, the outward protrusion being fitted into the inner groove so that the insert is fixed by the outward protrusion and the inner groove.

3. The apparatus as set forth in claim 1 wherein the receiving recess comprises a hole including an inner thread formed therein, the insert including an outer thread formed thereon, the insert being engaged with the hole threadedly to be fixed to the hole by the inner and outer threads.

4. The apparatus as set forth in claim 1 wherein the insert has a U-shaped section so that the axial groove comprises a semi-circular portion and a straight portion, the inward protrusion protruding into the semi-circular portion and the straight portion, the semi-circular portion having a center, the inward protrusion including a tapered surface formed thereon about the center of the semi-circular portion, the head having a circular-shaped section to include a tapered surface formed thereon, the tapered surfaces being engaged with each other to position the heat seal bar when the head is engaged with the inward protrusion.

* * * * *